INVENTOR.
CHARLES WESLEY BURROUGHS.
By
ATTORNEY.

Patented Feb. 18, 1930

1,747,421

UNITED STATES PATENT OFFICE

CHARLES WESLEY BURROUGHS, OF MONTREAL, QUEBEC, CANADA

STEAM GENERATOR

Application filed February 16, 1927. Serial No. 168,810.

This invention relates to apparatus for generating steam, and particularly to means employed with fuel in powdered or liquid form, fed through a burner.

The object of the invention is to provide improvements in the type of steam generator disclosed in my application filed in the United States Patent Office on July 3rd, 1925, Serial No. 41,443, whereby the circulation of water and the formation of steam take place at a more rapid rate, and an increased efficiency is obtained.

A further object is to provide a simpler construction having features which result in more convenient and easier operation, as well as increased flexibility.

In the apparatus specified in the above mentioned application, the combustion chamber took the form of a cylindrical cage of vertical water tubes, bent at their ends, which ends entered the sides of upper and lower drums. A refractory wall in contact with the upper and middle portions of the tubes left only a part of their surface exposed to the radiant heat of the flame. The lower drum was covered by refractory material and the feed pipe extended to the top of this drum.

Whereas in the apparatus herein specified, the combustion chamber is a cylindrical cage with conical ends, due to the tubes having offset bends which enter the bottom of the upper annular drum and the top of the lower annular drum. The wall surrounding the tubes is cylindrical but does not contact at all with the tubes, the whole surface of which is entirely exposed to the radiant heat either directly or by reflection from the wall. The feed pipes do not extend above the bottom of the lower drum.

Other features of distinction will be set forth hereafter. Reference is made to the accompanying drawings in which.

Figure 1:
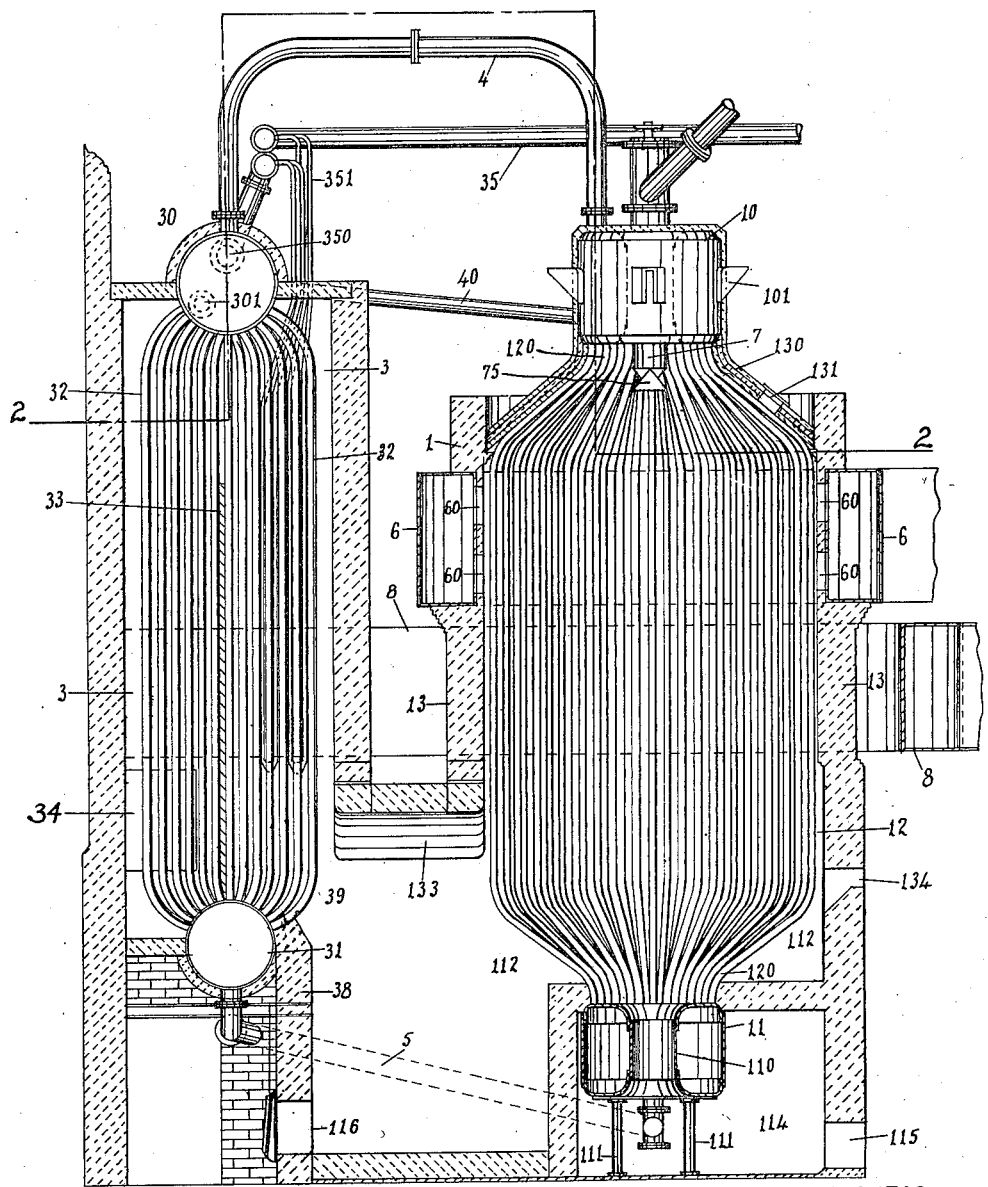
Figure 1 is a vertical cross section on the line 1—1 of Figure 2.

In Fig. 1 the upper header 10 is an annular drum providing an axial passage for the burner 7, and has brackets 101 by which it is suspended on suitable girders.

Figure 2:
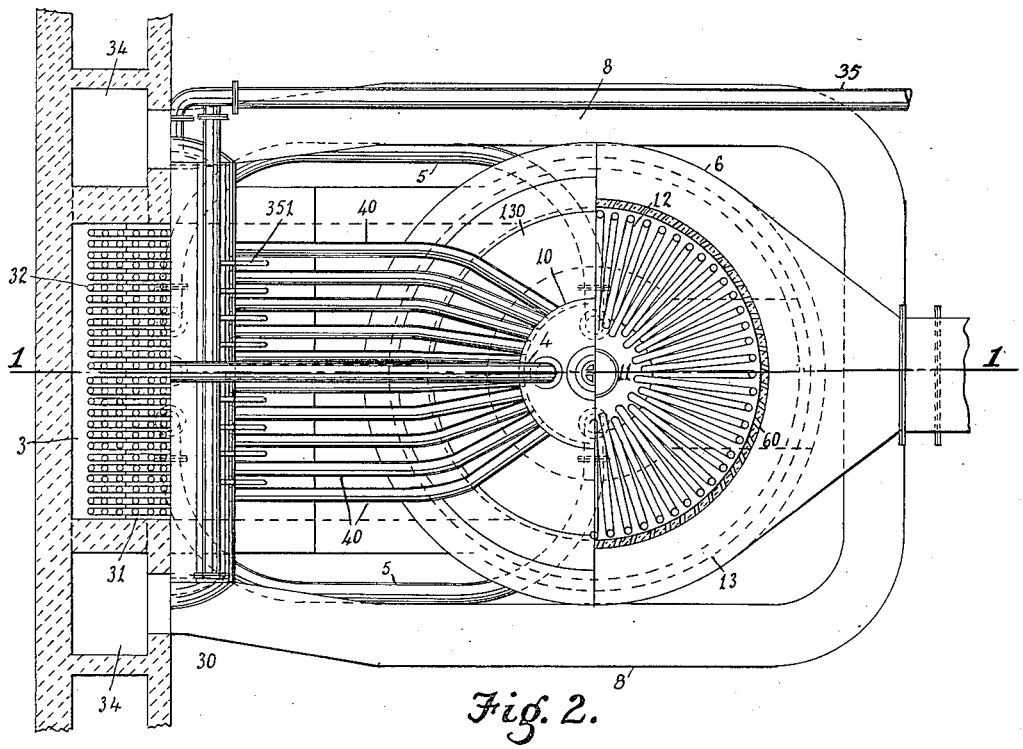
Figure 2 is a horizontal cross section on the line 2—2 of Figure 1 partly in plan.
Figure 3:
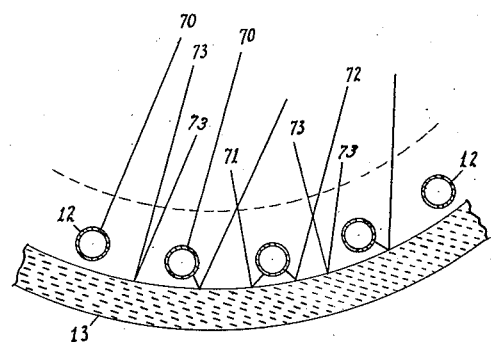
Figure 3 is an enlarged horizontal cross section of a portion of the wall and tubes of the combustion chamber.

The lower header 11 is also an annular drum with an axial passage 110 providing an outlet for ash, and is supported on pillars 111. Between these headers 10 and 11 are a series of vertical water tubes 12 with offset bends 120 at each end spaced apart as shown in Fig. 2 and staggered where they enter the bottom of the header 10 and the top of the header 11, forming a cylindrical cage with conical ends, surrounding the combustion chamber 1.

A cylindrical wall 13 of refractory material surrounds the upper and middle sections of the cage, a short space outside the tubes 12, with one or more horizontal rings of air inlets 60 from a preheated air manifold 6 which supply air to the upper section of the combustion chamber 1, and being under pressure the air enters the flame area.

Supported on the top of the wall 13 and resting on the bends 120 of the tubes 12 is a flexible brick cover which extends to the lower edge of the header 10. This cover has suitable torch holes 131 therethrough. The cover provides for the free expansion of the tubes 12.

Surrounding the lower section of the cage is a passage or chamber 112 which provides an outlet from the combustion chamber 1 between the lower sections of the tubes 12, whereby the combustion gases escape and pass through the passage 112 under the arch 133 through the opening 39 and into the chamber 3 at its lower end. The lower header 11 is preferably enclosed by a chamber 114 projecting into the passage 112, to permit of the ready removal of the ash which has fallen through the passage 110 from the combustion chamber 1.

The chamber 3 has a cross water drum 31 mounted on a brick setting 38, and a cross steam drum 30 at the top, with a connecting stack of vertical water tubes 32. A baffle 33 extends upwardly from the drum 31 to direct the flow of the gases which enter the chamber 3 through the opening 39. This flow is upwards through the tubes 32 inside the baffle 33 and downwards through the tubes 32 outside the baffle 33 and thence to the outlets 34 opening into gas ducts 8 which carry the gases to the air preheater. This latter is not shown in the drawings.

Between the water drum 31 and the lower header 11 one or more large pipes 5 run on an incline and outside the passage 112 to provide for the free circulation of the water from the drum 31. The upper header 10 is connected to the steam drum 30 by a series of water pipes 40 below the water line in both.

Preheated feed water enters the steam drum 30 through the inlet 301 at its end. An arched steam pipe 4 connects the top of the header 10 with the top of the drum 30. The drum 30 has a steam outlet 350 leading to the superheater 351 the small tubes of which extend downwardly into the chamber 3 and between the tubes 32 therein.

Suitable sight and soot blower holes 134 are provided in the wall around the lower section of the cage. Cleaning doors 115 to the chamber 114 and also 116 to the passage 112 permit of the ready removal of ash.

The burner 7 which projects into the top of the cage is preferably provided with a spreader tip 75 in order to form a cylindrical flame in the combustion chamber at once.

With a construction of this description, the fuel with sufficient air for ignition is fed under pressure through the burner and ignited through the torch hole in the cover. The conical flame produced by the spreader tip on reaching the neighbourhood of the first ring of air inlets becomes cylindrical and develops a high state of incandescence. The radiated heat from this flame strikes directly on the vertical tubes of the cage or on the refractory wall beyond the tubes wherein it is reflected to strike the outside surfaces of the tubes or to travel back into the flame area. The whole surface of the tubes is thus exposed to the radiant heat of the flame in a perfectly uniform and evenly distributed manner.

The heated gases produced by the flame pass out of the cage between the tubes in the lower section of the combustion chamber into the surrounding passage. These gases then pass under the arched wall and through the opening into the lower end of the adjacent chamber, where they enter between the tubes on the inside of the central baffle, in an upward flow, pass over the baffle and thence downwards between the tubes outside the baffle to the outlets of that chamber. The gases from these outlets then pass through the flue gas ducts to the air preheater and thence to the stack.

The feed water having been preheated in the usual method, enters the cross steam drum and mixes with the high temperature water in that drum, coming from the upflow tubes beneath and from the steam header of the combustion chamber. The downflow tubes outside the baffle carry the mixture down to the cross water drum below, which it reaches at a very high temperature.

In this drum the flow divides into two circuits, one of which passes back to the steam drum up through the tubes on the inside of the baffle, the other, which passes through the large feed pipes to the lower header of the combustion chamber and thence up through the tubes of the cage to the upper header and back through the water tubes to the steam drum.

Both of these circuits are comparatively short and are direct and unobstructed by pockets or other hindrances, and a very rapid circulation takes place in them.

As a result of the high temperature at which the water in both circuits starts to flow upwards and of the rapid circulation, the formation of steam is also very rapid.

The steam produced in the cage on reaching the upper header passes over to the steam drum and combines with the steam coming from the upflow tubes beneath it. The steam then passes through the steam outlet and thence to the superheater which is exposed to the gases in the adjacent chamber, and finally to the steam main.

Owing to the shape of the tubes forming the cage and their even and uniform exposure to the heat of the flame, the flow upward through them is completely balanced, and expansion is evenly distributed, thereby eliminating local stresses liable to cause distortion.

The lower bends of the tubes of the cage provide an integral funnel shaped water screen around and above the ash outlet in the lower header.

The cage with its tubes and headers thus combines in a single simple unit the functions of a multiplicity of separate devices now employed in other forms of steam generators.

In actual practice it has been found that with feed water entering the steam drum at 235° F. it is raised to 415° F. by the time it arrives at the water drum on the downflow, dividing into the two upflows, it is further raised to 425° F. when it reaches either the upper header or the steam drum. This would appear to show that the heat absorbed in the upflows is mainly taken up in forming steam. The output of steam is very large from the rapid generation which takes place in these two circuits with a common downflow.

I claim—

1. In a steam generator, a combustion chamber comprising an upper annular drum header, a lower annular drum header, connected by a cylindrical cage of a single series of vertical water tubes with offset bends which provide conical ends to the cage, and a refractory covering closely surrounding the middle and upper sections of the cage, the lower section of the cage being open to provide the outlet.

2. In a steam generator, a combustion chamber comprising an upper annular drum header adapted to contain an axial fuel burner, a lower annular drum header, connected by a single series of vertical water tubes with offset bends forming a cylindrical cage with conical ends, and a refractory wall closely surrounding the middle and upper sections of the cage, and a flexible cover between the top of the wall and the upper header and supported on the bends of the tubes.

3. In a steam generator, a combustion chamber comprising an upper annular drum header, an axial fuel burner therein, a lower annular drum header, connected by vertical water tubes with offset bends forming a cylindrical cage with conical ends, and a refractory wall surrounding the middle and upper sections of the cage, a flexible cover between the top of the wall and the upper header, supported on the bends of the tubes, and an outlet passage surrounding the lower uncovered section of the cage.

4. In a steam generator, a combustion chamber comprising an upper annular drum header, an axial fuel burner therein, a lower annular drum header connected by a cylindrical cage of vertical water tubes with offset bends forming conical ends to the cage, a refractory wall surrounding the middle and upper sections of the cage, with horizontal rings of air inlets in the upper part of the wall.

5. In a steam generator, a combustion chamber comprising an upper annular drum header, an axial fuel burner therein, a lower annular drum header connected by a cylindrical cage of vertical water tubes with offset bends forming conical ends to the cage a refractory wall surrounding the upper and middle sections of the cage, a cover between the top of the wall and the upper header, an air manifold around the upper section of the wall horizontal rings of air inlets from the manifold through the wall and an outlet passage surrounding the lower open section of the cage.

6. In a steam generator, the combination of a combustion chamber comprising an upper annular drum header, a lower annular drum header, connected by a cylindrical cage of vertical water tubes with offset bends, forming conical ends to the cage a refractory wall surrounding the upper and middle sections of the cage, a cover between the top of the wall and the upper header, an air manifold around the upper section of the wall and horizontal rings of air inlets from the manifold through the wall, with an axial fuel burner in the upper header having a spreader tip thereto.

7. In a steam generator, a combustion chamber comprising an upper annular drum header, a lower annular drum header, connected by a cylindrical cage of vertical water tubes with off set bends forming conical ends to the cage, a refractory wall surrounding the upper and middle sections of the cage, a cover between the top of the wall and the upper header, an air manifold around the upper section of the wall having horizontal rings of air inlets from the manifold through the wall, an outlet passage surrounding the lower open section of the cage leading to an opening in the lower part of an adjacent chamber containing a water tube boiler comprising a water drum at the bottom, a steam drum at the top, a stack of vertical water tubes connecting the drums having a central vertical baffle from the water drum, an outlet to the lower part of the chamber outside the baffle, and water tubes connecting the water drum with the lower header, and both water and steam pipes connecting the upper header and the steam drum, with feed water inlet and steam outlet to the steam drum.

CHARLES WESLEY BURROUGHS.